United States Patent
Coan et al.

(10) Patent No.: US 9,827,537 B2
(45) Date of Patent: Nov. 28, 2017

(54) POLYSULFONE MEMBRANE HAVING HIGH SELECTIVITY

(71) Applicant: PETROLIAM NASIONAL BERHAD, Kuala Lumpur (MY)

(72) Inventors: Frederick L. Coan, Antioch, CA (US); Arthur J. Barajas, Oakley, CA (US)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 0 days.

(21) Appl. No.: 14/781,408

(22) PCT Filed: Mar. 28, 2014

(86) PCT No.: PCT/US2014/032115
§ 371 (c)(1),
(2) Date: Sep. 30, 2015

(87) PCT Pub. No.: WO2014/165396
PCT Pub. Date: Oct. 9, 2014

(65) Prior Publication Data
US 2016/0038887 A1    Feb. 11, 2016

Related U.S. Application Data

(60) Provisional application No. 61/806,998, filed on Apr. 1, 2013.

(51) Int. Cl.
| | |
|---|---|
| B01D 39/00 | (2006.01) |
| B01D 39/14 | (2006.01) |
| C08G 73/10 | (2006.01) |
| C08K 5/34 | (2006.01) |
| B01D 71/06 | (2006.01) |
| B01D 33/21 | (2006.01) |
| B01D 63/02 | (2006.01) |
| B01D 63/06 | (2006.01) |
| B01D 71/68 | (2006.01) |
| D01D 5/16 | (2006.01) |
| D01F 1/08 | (2006.01) |
| B01D 69/08 | (2006.01) |
| B01D 53/22 | (2006.01) |
| C08K 5/06 | (2006.01) |

(52) U.S. Cl.
CPC .......... B01D 71/68 (2013.01); B01D 53/228 (2013.01); B01D 69/087 (2013.01); C08K 5/06 (2013.01); D01D 5/16 (2013.01); D01F 1/08 (2013.01)

(58) Field of Classification Search
None
See application file for complete search history.

(56) References Cited

U.S. PATENT DOCUMENTS

| | | |
|---|---|---|
| 5,049,169 A | 9/1991 | Teramoto et al. |
| 5,246,582 A | 9/1993 | Sluma et al. |
| 5,598,874 A | 2/1997 | Alei et al. |
| 5,618,332 A | 4/1997 | Ekiner et al. |
| 5,795,920 A | 8/1998 | Kang et al. |

FOREIGN PATENT DOCUMENTS

EP          636404      1/1998

OTHER PUBLICATIONS

Darvishmanesh et al. Journal of Membrane Science 379 (2011) 60-68.*
International Application No. PCT/US2014/032115, "International Search Report", dated Aug. 22, 2014,.

* cited by examiner

*Primary Examiner* — Robert T Butcher
(74) *Attorney, Agent, or Firm* — Kilpatrick Townsend & Stockton LLP

(57) ABSTRACT

A spin dope composition produces a polymeric fiber useful in non-cryogenic gas separation. The composition includes polysulfone as the polymeric component, two solvents, in which the polymer is soluble, and a non-solvent, in which the polymer is insoluble. The solvents preferably include N-methyl-pyrrolidone (NMP) and N,N-dimethyl acetamide (DMAC), and the non-solvent preferably includes triethylene glycol (TEG). Fibers made from the present composition have been found to exhibit superior properties of gas flux and selectivity, as compared with fibers made from spin dopes having only one solvent component.

4 Claims, No Drawings

US 9,827,537 B2

POLYSULFONE MEMBRANE HAVING HIGH SELECTIVITY

PRIOR RELATED APPLICATIONS

This application is a National Phase application of International Application No. PCT/US2014/032115, filed Mar. 28, 2014, which claims priority to U.S. Provisional Application No. 61/806,998, filed Apr. 1, 2013, each of which is incorporated herein by reference in its entirety.

BACKGROUND OF THE INVENTION

The present invention relates to the non-cryogenic separation of gas mixtures. The invention provides a composition of matter comprising a polymeric membrane which exhibits superior properties when used for the non-cryogenic separation of gases such as air.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

The effectiveness of a membrane in gas separation depends not only on the inherent selectivity of the membrane, but also on its capability of handling a sufficiently large product flow. A membrane module is therefore evaluated according to flux, i.e. the flow rates of various components through the membrane, as well as according to selectivity.

A polymeric fiber for use in the module described above is made from a mixture known as a "spin dope". The spin dope includes a polymeric material or precursor, a solvent which dissolves the polymer, and a non-solvent in which the polymer is insoluble. The spin dope comprises the material which is spun into a fiber. In general, one tailors the spin dope to control the formation of the fiber. That is, the composition of the spin dope determines when the polymeric material will undergo a transformation from a state in which it is intermixed and homogeneous in the spin dope, to a state in which the polymer is the principal component.

The fiber formulation is defined by three parameters, namely 1) the percentage of polymer in the spin dope, 2) the type of polymer solvent(s), and 3) the non-solvent in the mixture. The terms "solvent" and "non-solvent" are used to mean, respectively, the components of the spin dope in which the polymer is soluble and insoluble.

The present invention provides a composition for use in making a gas-separation membrane in which both the gas flux and selectivity are improved. The polymeric membrane of the present composition therefore reduces the capital cost for gas-separation systems.

SUMMARY OF THE INVENTION

The present invention comprises a spin dope composition, for use in making a polymeric fiber membrane for non-cryogenic gas separation. The composition comprises polysulfone as the polymeric component, two solvents in which the polymer is soluble, and a non-solvent in which the polymer is insoluble. The preferred solvents are N-methylpyrrolidone (NMP) and N,N-dimethyl acetamide (DMAC), and the preferred non-solvent is triethylene glycol (TEG). In a preferred embodiment, the ratio of weights of NMP/DMAC is in a range of about 80/20 to 20/80. In a more preferred embodiment, this ratio is about 60/40. The preferred range of the ratio of solvents to non-solvents is in a range of about 1.6-2.5. In a more preferred embodiment, the latter ratio is about 2.2.

The composition described above has been found to exhibit superior flux and selectivity properties, as compared with fiber made from spin dopes having a single solvent.

The present invention therefore has the primary object of providing a composition for making a polymeric fiber for use in non-cryogenic gas separation.

The invention has the further object of providing a polymeric fiber composition which exhibits superior properties of gas flux and selectivity.

The invention has the further object of enhancing the efficiency of a non-cryogenic gas separation process.

The invention has the further object of reducing the cost of separating gases by use of polymeric membranes.

The reader skilled in the art will recognize other objects and advantages of the present invention, from a reading of the following detailed description of the invention, and the appended claims.

DETAILED DESCRIPTION OF THE INVENTION

The present invention comprises a composition of matter, the composition being used to make a polymeric gas-separation membrane, wherein the membrane has both an enhanced gas flux and an enhanced selectivity.

In general, a spin dope formulation comprises 1) a polymer, 2) one or more solvents, and 3) one or more non-solvents. As used herein, the term "solvent" means a solution which dissolves the polymer, and a "non-solvent" means a solution which does not dissolve the polymer.

The composition which has been found to work best has been a composition containing about 35-55% polymer (by weight), a mixed solvent comprising N-methyl-pyrrolidone (NMP) and N,N-dimethyl acetamide (DMAC), and a non-solvent comprising triethylene glycol (TEG). The ratio, by weight, of solvent to non-solvent is in a range of about 1.6:1 to 2.5:1. The ratio, by weight, of NMP to DMAC is in a range of 80/20 to 20/80.

The preferred polymer in the present invention is polysulfone.

The spin dope of the present invention is used to produce a hollow fiber by extruding the spin dope through a die, and passing the resulting fiber through appropriate quench and leach baths so as to cool the fiber, and so as to remove residual solvents and non-solvents. The fibers so produced are formed into a bundle, using a loom to weave the fiber tows into a cloth. The cloth then goes through an additional hot extraction bath and then into an oven where it is dried and heat-treated. This process is described in U.S. Pat. No. 5,598,874, the disclosure of which is incorporated by reference herein. The fiber can then be assembled into a module, as described above, for use in gas separation.

The composition of the present invention has been found to produce a polymeric fiber having flux and selectivity which are substantially better than what is obtained with conventional fibers. The composition of the present invention has been shown to provide improvements of up to about 50% in both the oxygen flux and oxygen/nitrogen selectivity, when the fiber is used to separate air.

An important aspect of the present invention is the use of a mixed-solvent system. The preferred composition includes two solvents, and it has been found that this mixed-solvent composition provides much better fiber than that produced with spin dopes having only one solvent component.

Single-solvent spin dope compositions, such as compositions having NMP as the single solvent, in a concentration of greater than about 30%, typically produce fiber having poor transport properties. These compositions also exhibit high shrink rates and welded fibers in the downstream process, due to the high temperature, of the order of 100° C., used to dry the fibers and to remove residual solvent. In terms of the ratio of solvent to non-solvent (i.e. the ratio of NMP to TEG), the above formulation would translate into a maximum ratio of about 1.6-1.7. Above this ratio of solvent to non-solvent, in a single-solvent composition, the fiber produced could not be sampled.

It was attempted to make spin dope compositions having DMAC as the single solvent, again with solvent concentrations of greater than about 30%. However, the resulting transport properties of the fibers produced were again poor. The hollow fiber membranes produced from these compositions had better resistance to the downstream process temperatures, and did not exhibit the welded fibers seen in the case where NMP was the single solvent.

But the use of NMP and DMAC together, as a mixed solvent, made it possible to use ratios of solvent to non-solvent as high as about 2.5 without encountering the downstream process problems described above, in the case of the use of NMP alone. This mixed solvent spin dope also produced significantly improved membrane transport properties, as detailed in the following Example.

EXAMPLE

The Example consisted of three tests. In Test No. 1, the spin dope contained a single solvent, comprising NMP. In Test No. 2, the spin dope contained a single solvent, comprising DMAC. In Test No. 3, the spin dope contained a mixed solvent comprising both NMP and DMAC, in which the ratio NMP/DMAC, by weight, was 60/40. In all three tests, the non-solvent was TEG, and the polymer was polysulfone.

The following Table 1 summarizes the parameters of each test:

TABLE 1

|  | Test No. 1 | Test No. 2 | Test No. 3 |
| --- | --- | --- | --- |
| Solvent: | NMP | DMAC | NMP/DMAC: 60/40 |
| Melt pump: | 68 gm/min | 65 gm/min | 65 gm/min |
| Non-solvent: | TEG | TEG | TEG |
| S/NS ratio: | 1.50 | 2.2 | 2.2 |
| Quench temp: | 4.0 C. | 6.0 C. | 5.3 C. |
| Leach temp: | 70 C. | 41 C. | 36 C. |
| Line rate: | 120 ft/min | 130 ft/min | 130 ft/min |
| Solids: | 50% | 50% | 47% |
| Spin temp: | 68 C. | 53 C. | 60 C. |

For Test 2, the fibers were assembled into a bundle which was about 35 cm long, and which had 90 fibers. The bundle was soaked in water at 90° C. for 2-7.5 hours followed by air drying at 50° C. for 40 minutes.

For Tests 1 and 3, the fibers were assembled using the loom process described in the above-cited U.S. Pat. No. 5,598,874, with a loom oven drying temperature of 50° C.

The results of the three tests are summarized in Table 2.

TABLE 2

|  | Test No. 1 | Test No. 2 | Test No. 3 |
| --- | --- | --- | --- |
| O2 Flux GPU (×10−6 scc/sec-cm2-cm Hg) | 0.70 | 2.00 | 3.05 |
| N2 Flux GPU | 0.25 | 1.74 | 0.74 |
| O2/N2 selectivity: | 2.8 | 1.15 | 4.12 |
| OD × ID (microns): | 296 u × 203 u | 250 u × 140 u | 250 u × 135 u |
| Shrinkage (inches) @ Loom oven temp: | 2.5 inches @ 50 C. | No loom samples | 0.75 inches @ 50 C. |

The above tests show that the mixed-solvent spin dope produces a membrane having significantly improved transport properties, as compared to the single-solvent spin dope membranes of the prior art. The mixed-solvent membranes of the present invention showed improvements, in both oxygen flux and selectivity, of about 50%. As noted previously, the addition of DMAC allowed the NMP to be used at the higher solvent ratios (greater than 1.6) without the associated downstream process and sampling problems.

The parameters used in making the spin dope composition of the present invention can be varied. The melt pump may operate in a range of about 45-120 gm/min. The ratio of NMP to DMAC may be in the range from 80/20 to 20/80. The S/NS ratio (solvent to non-solvent ratio) can be in a range of about 1.6 to 2.5. The quench temperature can be in a range of 4-30° C., and the leach temperature can be in a range of 25-85° C. The line rate can be in a range of about 100-350 ft/min. The percentage of solids can be about 35-55%. The spin temperature (i.e. the temperature of the spin dope as it is extruded through the die) can be about 55-85° C.

The invention can be modified in other ways that will be apparent to those skilled in the art. For example, the ratio of solvent to non-solvent can be varied, within the range specified above. The exact choice of solvent and non-solvent, as well as the choice of polymer, may be varied. These and other variations should be considered within the spirit and scope of the following claims.

What is claimed is:

1. A spin dope composition for making a polymeric fiber membrane for use in non-cryogenic gas separation, the composition comprising 35 to 55 wt. % polysulfone, a solvent comprising a mixture of N-methyl-pyrrolidone (NMP) and N,N-dimethyl acetamide (DMAC) in a 60/40 weight ratio respectively, and a non-solvent comprising triethylene glycol (TEG).

2. The composition of claim 1, wherein a ratio, by weight, of solvents to non-solvents is in a range of about 1.6-2 respectively.

3. A composition for use as a spin dope for forming a polymeric fiber membrane for use in non-cryogenic gas separation, the composition comprising polysulfone, two solvents which dissolve polysulfone, said solvents including N-methyl-pyrrolidone (NMP) and N,N-dimethyl acetamide (DMAC), and a non-solvent comprising triethylene glycol (TEG), wherein NMP and DMAC are present in the composition in a ratio of 60/40 by weight respectively, and wherein a ratio of a weight of the two solvents to a weight of the nonsolvent is 2.2, respectively.

4. The composition of claim 1, wherein the weight ratio of solvents to non-solvent is 2.2, respectively.

* * * * *

UNITED STATES PATENT AND TRADEMARK OFFICE
CERTIFICATE OF CORRECTION

| | |
|---|---|
| PATENT NO. | : 9,827,537 B2 |
| APPLICATION NO. | : 14/781408 |
| DATED | : November 28, 2017 |
| INVENTOR(S) | : Frederick L. Coan and Arthur J. Barajas |

It is certified that error appears in the above-identified patent and that said Letters Patent is hereby corrected as shown below:

In the Claims

In Column 6, Line 2 of Claim 2, please delete "of about 1.6-2" and replace with -- of about 1.6-2.5, --

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*